(12) United States Patent
Koch et al.

(10) Patent No.: US 12,537,366 B2
(45) Date of Patent: Jan. 27, 2026

(54) SYSTEMS AND METHODS FOR DISTRIBUTING OPTICAL SIGNALS USING A PHOTONIC INTEGRATED CIRCUIT

(71) Applicant: Quintessent Inc., Goleta, CA (US)

(72) Inventors: Brian Koch, Santa Barbara, CA (US); Alan Liu, Santa Barbara, CA (US); Daniel Knight Sparacin, San Carlos, CA (US)

(73) Assignee: Quintessent Inc., Goleta, CA (US)

( * ) Notice: Subject to any disclaimer, the term of this patent is extended or adjusted under 35 U.S.C. 154(b) by 974 days.

(21) Appl. No.: 17/708,856

(22) Filed: Mar. 30, 2022

(65) Prior Publication Data

US 2022/0320832 A1 Oct. 6, 2022

Related U.S. Application Data

(60) Provisional application No. 63/168,585, filed on Mar. 31, 2021.

(51) Int. Cl.
*H01S 3/00* (2006.01)
*G02B 6/28* (2006.01)
(Continued)

(52) U.S. Cl.
CPC .......... *H01S 5/5027* (2013.01); *G02B 6/2808* (2013.01); *G02B 6/29343* (2013.01);
(Continued)

(58) Field of Classification Search
CPC ....... H01S 5/5027; H01S 5/34; G02B 6/2808; G02B 6/29343; G02B 6/4215; H04B 10/50572
See application file for complete search history.

(56) References Cited

U.S. PATENT DOCUMENTS

| 6,798,568 B1 * | 9/2004 | Wang | H01S 5/5009 359/344 |
| 11,650,296 B2 * | 5/2023 | Yao | G01S 17/88 356/5.01 |
| 2022/0236417 A1 * | 7/2022 | LaChapelle | G01S 7/4815 |

OTHER PUBLICATIONS

D. Yin et al., "Laser Diode Comb Spectrum Amplification Preserving Low RIN for High-Speed Modulation", Optical Society of America, dated 2009, 2 pp.
(Continued)

*Primary Examiner* — Mark Hellner
(74) *Attorney, Agent, or Firm* — Kaplan Breyer Schwarz LLP

(57) ABSTRACT

The present disclosure is directed to light-distribution systems on photonic integrated circuits (PIC) that split and amplify a light signal received from at least one remotely located laser into a plurality of amplified light signals, where amplification is provided by an integrated semiconductor optical amplifier (SOA). By locating the laser remotely with respect to the SOA-based PIC, the laser and PIC can be subjected to different ambient environmental conditions. Additionally, a lower-power laser can be used since the optical loss associated with splitting is compensated for by the amplification. As a result, lower current densities and optical powers can be used in both the source laser and the SOA. In some embodiments, the sequence of power splitting and amplification is repeated multiple times, thereby enabling system to scale gracefully.

39 Claims, 8 Drawing Sheets

(51) Int. Cl.

| | |
|---|---|
| *G02B 6/293* | (2006.01) |
| *G02B 6/42* | (2006.01) |
| *H01S 5/34* | (2006.01) |
| *H01S 5/50* | (2006.01) |
| *H04B 10/50* | (2013.01) |

(52) U.S. Cl.
CPC .............. *G02B 6/4215* (2013.01); *H01S 5/34* (2013.01); *H04B 10/50572* (2013.01)

(56) References Cited

OTHER PUBLICATIONS

Guilhem de Valicourt et al., "Semiconductor Optical Amplifier for Next Generation of High Data Rate Optical Packet-Switched Networks", "Some Advanced Functionalities of Optical Amplifiers", Chapter 3, Intech, dated 2015, http://dx.doi.org/10.5772/61990, pp. 47-84.

J. C. Hulme et al., "Fully integrated hybrid silicon two dimensional beam scanner", "Optics Express", Feb. 25, 2015, Optical Society of America, DOI:10.1364/OE.23.005861, 14 pp., vol. 23, No. 5.

Lianping Hou et al., "Monolithic Mode-Locked Laser With an Integrated Optical Amplifier for Low-Noise and High-Power Operation", IEEE Journal of Selected Topics in Quantum Electronics, Jan. 9, 2013, DOI: 10.1109/JSTQE.2013.2238508, 8 pp., vol. 19, No. 4.

M. Gay et al., "Single Quantum Dash Mode-Locked Laser as a Comb-Generator in Four-Channel 112 Gbit/s WDM Transmission", Optical Fiber Communication Conference, San Francisco, California, "OSA Technical Digest",, Mar. 9, 2014, Optica Publishing Group, ISBN:978-1-55752-993-0, 3 pp., https://doi.org/10.1364/OFC.2014.Tu2H.5.

Minoru Yamada et al., "Variation of Relative Intensity Noise With Optical Power in InGaAsP Semiconductor Optical Amplifier", "IEEE Photonics Technology Letters", Nov. 15, 2012, DOI: 10.1109/LPT.2012.2219302, pp. 2049-2051, vol. 24, No. 22.

Siddharth Joshi et al., "Mode Locked InAs/InP Quantum dash based DBR Laser monolithically integrated with a semiconductor optical amplifier", The 25th International Conference on Indium Phosphide and Related Materials, May 19-23, 2013, Kobe, Japan, 2 pp.

\* cited by examiner

SYSTEMS AND METHODS FOR DISTRIBUTING OPTICAL SIGNALS USING A PHOTONIC INTEGRATED CIRCUIT

CROSS REFERENCE TO RELATED APPLICATIONS

This application claims the benefit of U.S. Provisional Patent Application Ser. No. 63/168,585 filed Mar. 31, 2021, which is incorporated by reference as if set forth at length herein.

TECHNICAL FIELD

The present disclosure relates to photonic devices in general, and, more particularly, to light distribution using semiconductor lasers and photonic integrated circuits comprising optical splitters and semiconductor optical amplifiers.

BACKGROUND

Distribution of an unmodulated (i.e., continuous wave (CW)) light signal containing one or more wavelength components to a plurality of outputs is required in many applications, such as high-bandwidth network switching, datacenter servers, photonic-based computing, high-performance computers, multi-directional LIDAR systems, and the like.

In datacenters and high-performance computing, for example, bandwidth requirements are growing rapidly, requiring new approaches to realizing high-bandwidth systems, many of which require the same CW light signal to be routed on spatially diverse paths. In such cases, these light signals are routed to optical data modulators (also referred to simply as "modulators"), which encode electrical data onto their respective optical signals. The modulated signals are then transmitted over fiber-optic links to optical receivers where the data is converted back into the electrical domain for computer processing. For such applications, it is critical to keep total power consumption low, optimize wall plug efficiency, minimize device and connection area to maintain high-bandwidth density per unit area, keep optical power within eye-safety limits, and meet stringent lifetime and reliability requirements of the optoelectronic components. These factors are all critical to enabling continued scaling of input/output bandwidth for generations to come.

Unfortunately, current approaches for splitting a light signal and distributing it to multiple outputs have many disadvantages. For example, a common approach is to generate a very high-power light signal and simply split it as many times as needed. However, high-power lasers require higher current densities and higher optical powers being emitted from the material, which can reduce the lifetime of the lasers and cause catastrophic device failure or yield problems. In addition, eye safety is an issue for high laser powers, leading to additional safety measures and associated additional cost and overhead. Still further, for some laser wavelengths, high power diode lasers have not been thoroughly investigated for high-volume commercial deployment. Finally, there is an upper limit to the number of times a high-power laser can be split, since a laser cannot output infinitely high power and fiber-optic systems and photonic-integrated circuit waveguides can be susceptible to failure due to interface burns, exhibit fiber and waveguide nonlinearities (e.g., the optical Kerr effect, etc.), as well as power-dependent loss (e.g., two-photon absorption, etc.), which can arise at power levels at or below 100 mW for typical silicon photonic waveguides. As a result, in some cases, it can only be practical to split a single high-power light signal 4 or 8 times, for example.

Another conventional approach is to use multiple copies of the same laser structure to generate a plurality of lower-power light signals, each of which is provided to a different data modulator. Unfortunately, such approaches are fraught with high cost and yield issues, as well as complex packaging requirements that further add to overall system cost.

For example, lasers can be expensive to manufacture and typically require careful temperature control and/or other control mechanisms to keep the output wavelength controlled within a desired range, which can be challenging. This is particularly important for lasers used in wavelength division multiplexing (WDM) systems. As a result, a plurality of lasers normally requires an equal number of control electronics modules and optical functionalities. Furthermore, the chip real estate required for multiple lasers scales linearly with the number of lasers used.

In addition, many lasers require special packaging functions, such as optical isolation to maintain output-signal quality. High-performance lasers, in particular, are known to be very sensitive to back-reflections, often down to −30 dB or even −50 dB reflection levels in some cases. As a result, every laser in a multi-laser system also typically requires an optical isolator at its output. The cost of each optical isolator is substantial and is that cost is multiplied by the number of lasers included in such systems.

Most lasers also require stable temperature, which adds additional infrastructure for temperature monitoring and cooling or heating (e.g., thermoelectric coolers, integrated heaters, etc.). Such infrastructure also typically scales linearly with the number of lasers used.

In some prior-art approaches, multiple lasers and the modulators used to imprint data on their light signals have been combined on the same substrate (or carrier) to attempt to reduce the costs associated with multiple light sources. While this has the potential to reduce optical loss and, possibly, manufacturing costs, to date, it has proven difficult to realize these advantages for several reasons.

First, encoding and decoding the digital information on a light signal is preferably done as close to a computing node as possible. Computing nodes, however, are normally associated with high temperature environments due to their very-high power consumption. This exacerbates the challenges associated with temperature stabilization of the lasers that are co-located with the modulators.

Second, co-fabrication of lasers and modulators typically requires a compromise for one, or both, device designs. In addition, it can lead to higher fabrication cost. Since SOA require less processing and/or material complexity compared to lasers, co-fabrication of SOA with modulators can be more straightforward and cost effective. For example, some laser designs can benefit from more-advanced process features or more-advanced materials than would be required for an SOA, such as higher-resolution gratings and/or more-complex material stacks. By fabricating the lasers separately, more expensive advanced processing and materials can be used only for forming the lasers. In contrast, when co-fabricated, only the small laser-occupied portion of the total area of the large, composite chip benefits from the use of advanced processing and materials; however, the associated costs are accrued for the entire combined device structure.

In wavelength-division-multiplexed (WDM) systems, a conventional approach to signal distribution is to split a multi-wavelength signal into its individual wavelength components and then amplify each component. Unfortunately, this has negative implications for bandwidth density. First, once the wavelength components are spatially separated there is less opportunity for data encoding on a given spatial channel (only one wavelength component per spatial channel). It is possible to re-multiplex the signals after amplification, but this can give rise to significant link loss.

The need for a simple, low-cost approach to a generate a plurality of light signals, each of which can be provided to a different output remains, as yet, unmet in the prior-art.

SUMMARY

The present disclosure is directed to light-distribution systems on photonic integrated circuits that split and amplify a light signal received from at least one remotely located laser into a plurality of light signals, where amplification is provided by an integrated semiconductor optical amplifier (SOA). In some embodiments, multiple remote lasers provide a plurality of light signals to a PIC, which subsequently splits and amplifies each light signal into multiple light signals. In some embodiments, amplification occurs prior to the light signal(s) being split. Embodiments in accordance with the present disclosure are particularly well suited for use in wavelength-division multiplexed telecom and datacom systems, high-bandwidth network switching, datacenter servers, application-specific computers, high-performance computers, multi-directional LIDAR systems, and the like.

Like light-distribution systems known in the prior art, systems in accordance with the present disclosure include an optical-power splitting network that splits the power of an input optical signal into a plurality of light signals, each of which is conveyed to a different output port. In the prior art, high-power light signals are provided to a power-splitting network.

In sharp contrast to the prior art, embodiments in accordance with the present disclosure employ remotely located laser sources that provide low- to moderate-power light signals to a PIC, which power splits the received light signal(s) into individual light signals, each of which is subsequently amplified via an SOA en route to its respective output port. As a result, the present disclosure affords light-distribution systems significant advantages over prior-art light-distribution systems. In particular, by locating the laser remotely with respect to the PIC, the laser and PIC can have different ambient environmental conditions. Additionally, by using a lower-power laser and subsequently amplifying its output after incurring the optical loss associated with power splitting, lower current densities and optical powers can be used in both the source laser and the SOA. Furthermore, keeping optical power relatively lower throughout an optical link can reduce the occurrence of fiber burns or power dependent nonlinearities/losses in fibers and waveguides. Still further, the sequence of power splitting an optical signal and then amplifying it can be repeated multiple times, thereby providing a scalable solution. It should be noted that degradation of the CW light signal, in terms of noise, can also be mitigated if the power level of the input to each SOA remains sufficiently high.

An illustrative embodiment of the present disclosure is an optical system comprising a laser for providing a light signal that is a WDM signal that includes a plurality of wavelength components, a power splitter, a plurality of SOA, and a plurality of modulator arrays, where each modulator array includes a plurality of modulators that are optically coupled with an output port, and where each modulator is configured to modulate a different wavelength component provided by the laser. The laser provides a low- to moderate-power, multi-wavelength light signal to the power splitter, which power splits it into a plurality of multi-wavelength light signals. Each light signal propagates through a separate waveguide to a different SOA, where it is amplified. Data is then imprinted on each wavelength component of each amplified light signals by the modulators of its respective modulator array. The modulated, amplified light signals are then provided their respective output ports.

In some embodiments, the light signal is amplified by the SOA prior to its being split into a plurality of light signals. In some embodiments, a combination of splitting/amplification sequences is employed. In some embodiments, more than one sequence of splitting/amplification is employed.

In some embodiments, the light signal is single-wavelength signal that is power split and amplified (or amplified and then power split). In some such embodiments, at least one of the lights signals is a WDM signal that is wavelength demultiplexed prior to being received by one or more data modulators.

In some embodiments, a power splitter includes multiple input ports such that at least one additional laser can be used to provide redundancy.

An embodiment in accordance with the present disclosure is a light-distribution system comprising: a first light source for providing a first laser signal; and a first photonic integrated circuit (PIC) comprising a first splitting/amplification (S/A) network that is configured to receive the first laser signal and provide a first plurality of amplified light signals based on the first light signal; wherein the first light source and first PIC are optically coupled via an optical path that enables the first light source to be remotely located relative to the first PIC such that the first light source and first PIC can reside in different environments.

Another embodiment in accordance with the present disclosure is a method for distributing light, the method including: generating a first laser signal at a first light source; coupling the first laser signal into an input port of a first photonic integrated circuit (PIC) that includes a first splitting/amplification (S/A) stage having (1) a first amplification stage comprising at least one semiconductor optical amplifier (SOA) and (2) a first optical-power splitting network; and splitting and amplifying the optical energy of the first laser signal in the first S/A stage to generate a first plurality of amplified light signals.

DETAILED DESCRIPTION

Prior-art systems use a plurality of lasers to generate a like-number of light signals. In contrast, systems in accordance with the present disclosure employ a photonic integrated circuit (PIC) that includes a splitting/amplification stage comprising power splitters and SOA, where the PIC receives at least one light signal and provides a plurality of amplified light signals generated from each received light signal. The laser and PIC are located remotely from one another such that each resides in a different environment. As a result, systems disclosed herein can be significantly more tolerant to temperature conditions.

Figure 1:
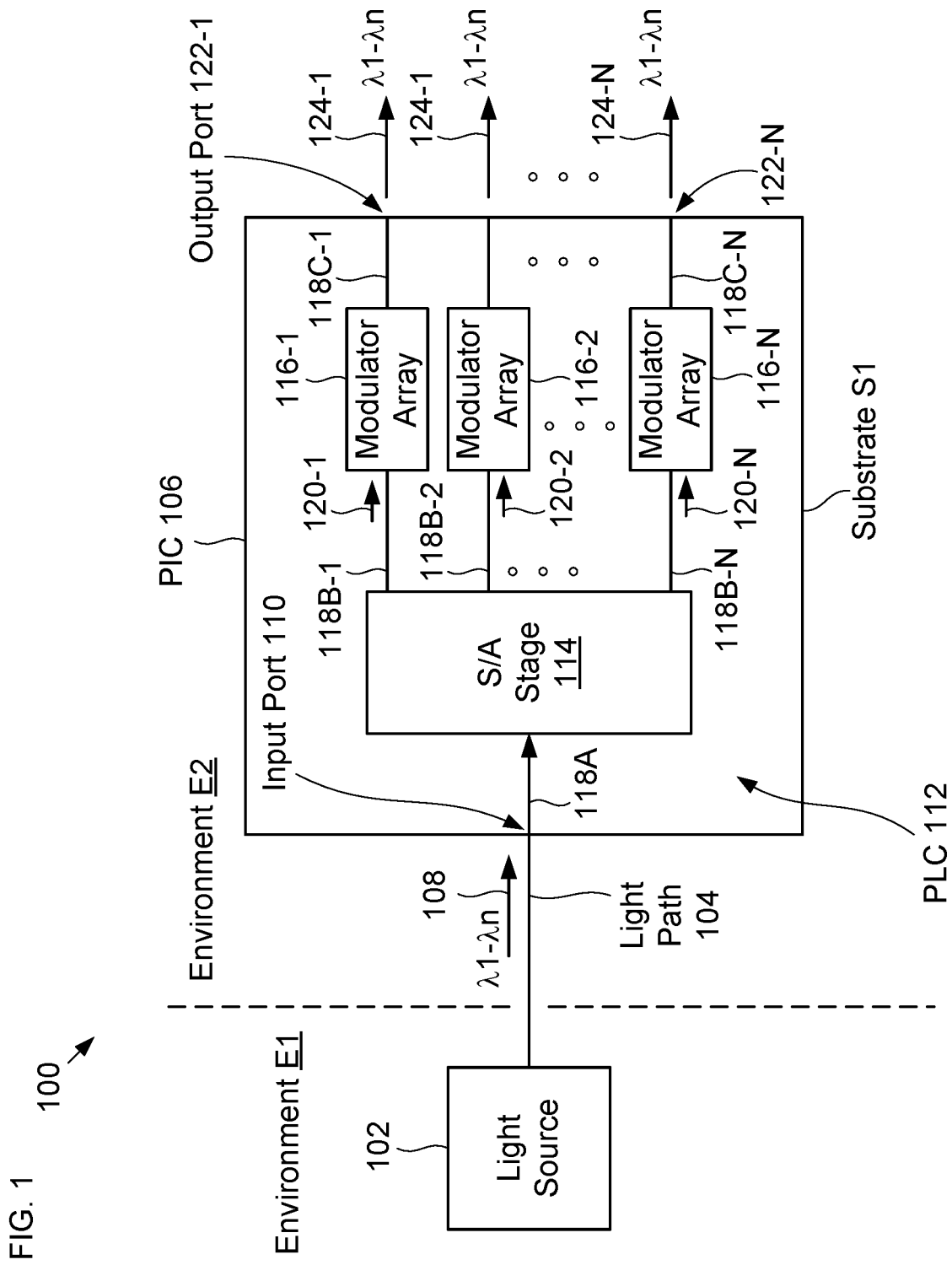
FIG. 1 depicts a schematic drawing of an illustrative embodiment of a light distribution system in accordance with the present disclosure.

FIG. 1 depicts a schematic drawing of an illustrative embodiment of a light distribution system in accordance with the present disclosure. System 100 includes light source 102 and PIC 106, which are optically coupled via optical path 104. System 100 is configured such that it provides a plurality of amplified light signals via one or more SOA located on PIC 106, rather than generating multiple light signals by an equal number of lasers.

Figure 2:
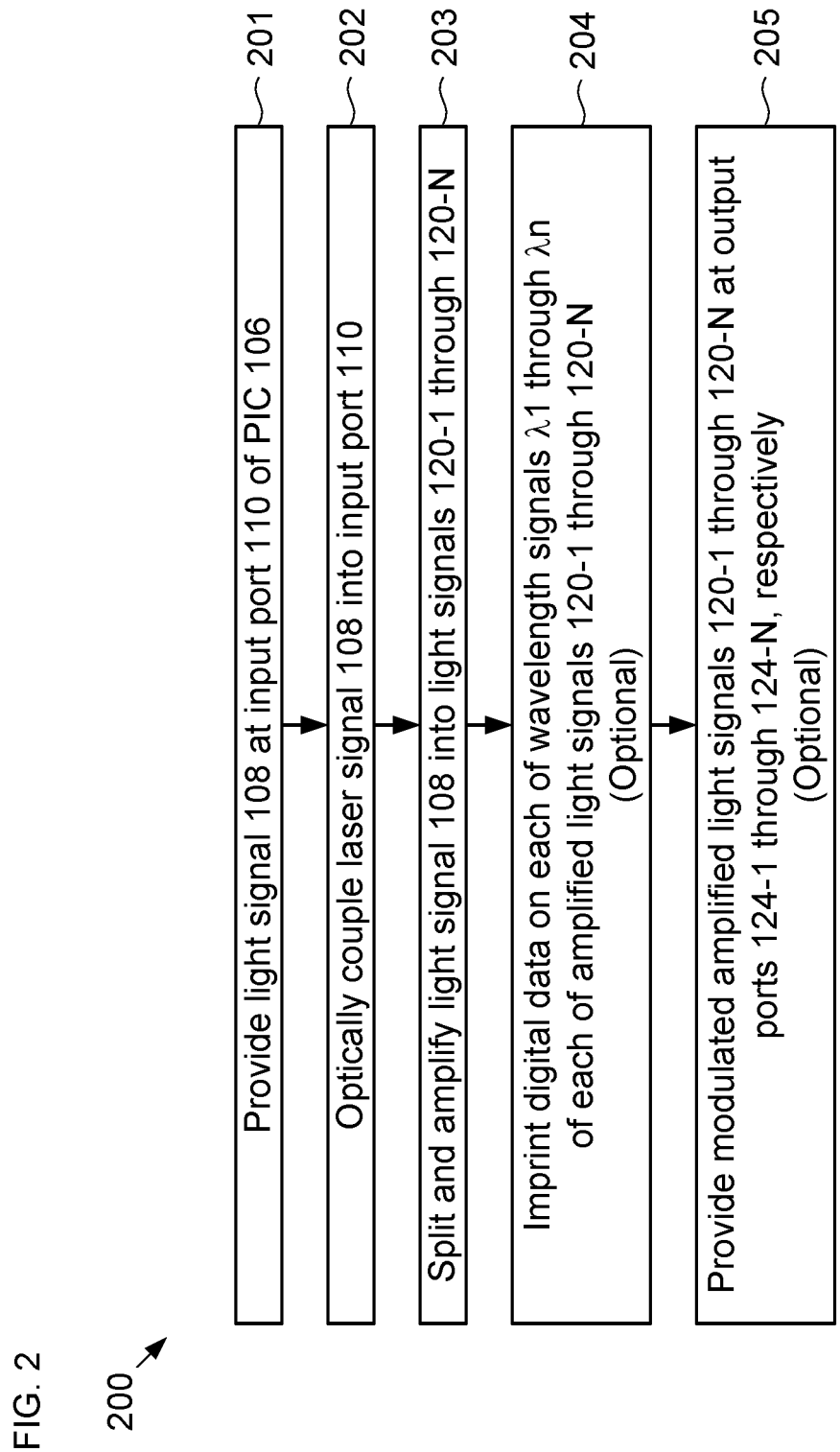
FIG. 2 depicts operations of a method for providing a plurality of light signals in accordance with the present disclosure.

FIG. 2 depicts operations of a method for providing a plurality of light signals in accordance with the present disclosure. Method 200 begins with operation 201, wherein light source 102 provides light signal 108.

Light source 102 is a laser module comprising a high-performance laser that provides laser signal 108 on optical path 104. In the depicted example, light source 102 provides laser signal 108 as a low- to moderate-power continuous-wave (CW) wavelength-division-multiplexed (WDM) laser signal that includes multiple wavelength components, λ1 through λn, where n=any practical number of wavelength components. In the depicted example, n=32. In some embodiments, laser signal 108 is provided as a low- to moderate-power single-wavelength laser signal. In some embodiments, laser signal 108 is provided as a single-wavelength laser signal that is tunable over a desired spectral range. Light source 102 is located in ambient environment E1.

In some embodiments, light source 102 includes a plurality of fixed-wavelength lasers whose outputs are combined to form laser signal 108. In some embodiments, light source 102 includes a mode-locked laser.

In some embodiments, laser signal 108 is a pulsed signal comprising a series of laser pulses.

At operation 202, laser signal 108 is coupled into input port 110 of PIC 106.

Optical path 104 is configured to optically couple light source 102 and PIC 106 such that they can be located remotely with respect to one another. In other words, optical path 104 enables light source 102 and PIC 106 to reside in different environments such that each is subject to different ambient conditions. For the purposes of this Specification, including the appended claims, the term "remotely located" is defined as being located in different environments that have at least one different environmental parameter, such as ambient temperature, temperature stability, and the like.

In the depicted example, optical path 104 is a conventional optical fiber that conveys laser signal 108 from light source 102 to PIC 106 where its optical energy is optically coupled into input port 110. In some embodiments, laser signal 108 is transmitted from light source 102 to PIC 106 via free space. In some embodiments, input port 110 includes a mode-size converter to improve coupling efficiency. In some embodiments, input port 110 includes a grating coupler for receiving laser signal 108.

PIC 106 includes planar-lightwave circuit (PLC) 112, splitting/amplification (S/A) stage 114, and modulator arrays 116-1 through 116-N (referred to, collectively, as modulator arrays 116), all of which are disposed on substrate S1. PIC 106 is configured to receive laser signal 108 and split and amplify it to generate a plurality of light signals. In the depicted example, PIC 106 is further configured to imprint a data signal on each wavelength components included in each of the plurality of light signals it provides.

PIC 106 is located in ambient environment E2, which is different and remote from environment E1.

PLC 112 includes a network of integrated-optics surface waveguides 118 that is arranged to split laser signal 108 into N equal-intensity light signals and convey each of the N light signals to an SOA and a modulator array 116. In the depicted example, surface waveguides 118 are silicon-based; however, PLC 112 can include surface waveguides comprising any suitable material such as silicon nitride, silicon dioxide, compound semiconductors, combinations thereof, and the like.

At operation 203, the optical energy of the laser signal 108 is split into N substantially equal-intensity light signals and amplified, thereby providing amplified light signals 120-1 through 120-N (referred to, collectively, as amplified light signals 120). In the depicted example, N is equal to 8; however, N can have any practical value without departing from the scope of the present disclosure.

Figure 3:
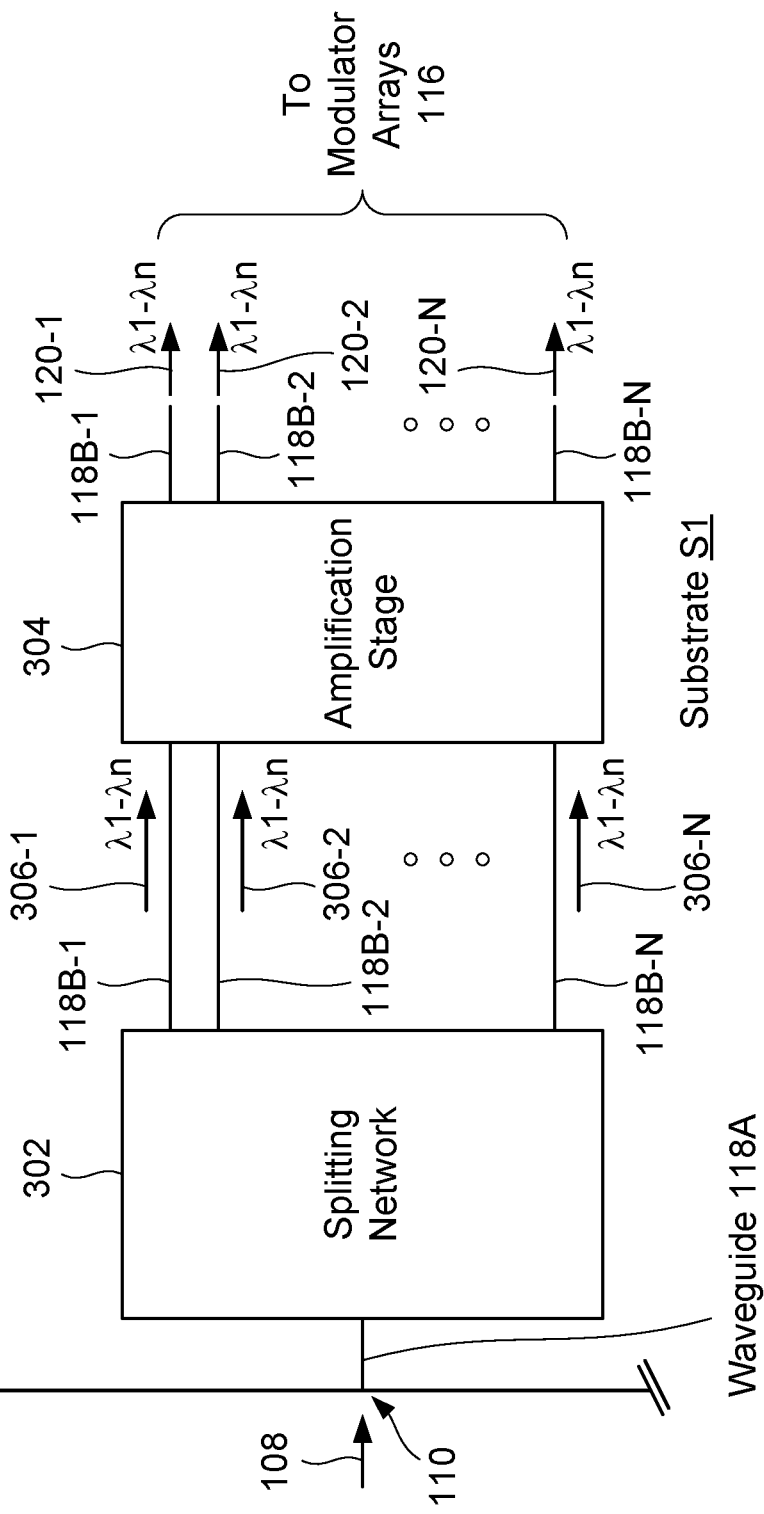
FIG. 3 depicts a schematic drawing of a splitting/amplification network in accordance with the illustrative embodiment.

FIG. 3 depicts a schematic drawing of a splitting/amplification stage in accordance with the illustrative embodiment. S/A stage 114 includes splitting network 302 and amplification stage 304.

Figure 4:
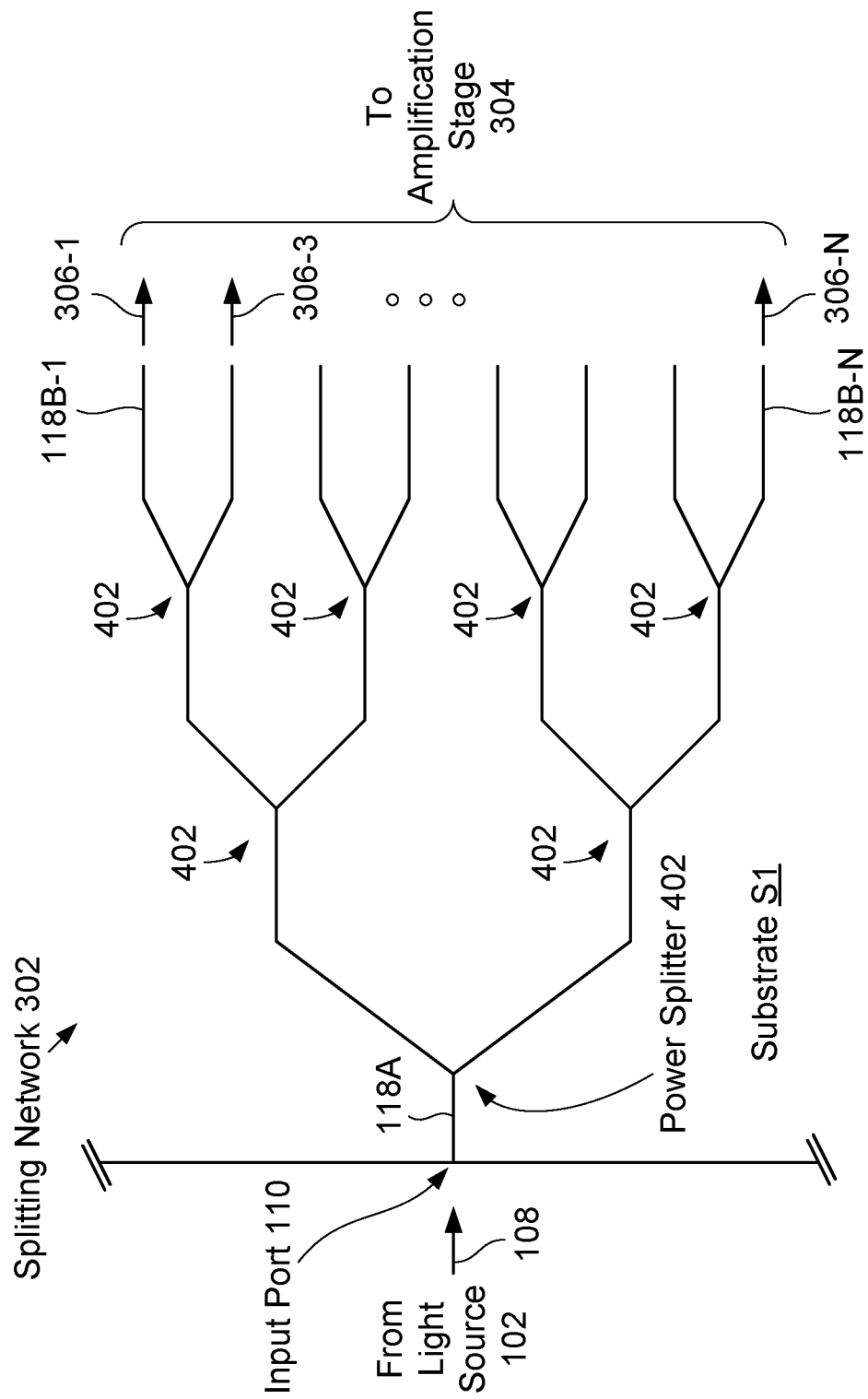
FIG. 4 depicts a schematic drawing of a splitting network in accordance with the illustrative embodiment.

FIG. 4 depicts a schematic drawing of a splitting network in accordance with the illustrative embodiment.

Splitting network 302 is an optical-power splitting network that comprises an arrangement of surface waveguides 118 and power splitters 402 that collectively distribute the optical energy received at input port 110 into N substantially equal-intensity light signals 306-1 through 306-N (referred to, collectively, as light signals 306), each containing approximately $1/N^{th}$ of the optical energy of light signal 108. In the depicted example, N=8 and splitting network 302 comprises a binary tree of 3 stages of power splitters 402, each of which is a 1×2 y-junction splitter.

In some embodiments, splitting network 302 has a hierarchical arrangement of power splitters having other than three stages.

In some embodiments, at least one of power splitters 402 is a power-splitting element other than a 1×2 y-junction splitter. Power-splitting elements suitable for use in accordance with the present disclosure include, without limitation, 50:50 directional couplers, 1×2 multi-mode interference (MMI) couplers, 1×m MMI couplers (where m is greater than 2), a×b MMI couplers (where a and b are both greater than 1), 1×m splitters, and the like. In some applications, it is desirable that light signals 306 and/or output signals 124 have non-uniform power levels; therefore, in some embodiments, at least one of power splitters 402 has a splitting ratio other than 50:50.

In some embodiments, splitting network 302 includes a different hierarchical arrangement of 1×m power splitters. In some embodiments, splitting network 302 includes a single-stage 1×N power splitter. In some embodiments, splitting network 302 includes a single-stage m×N power splitter (m>1).

Splitting network 302 provides light signals 306-1 through 306-N to amplification stage 304 via surface waveguides 118B-1 through 118B-N, respectively.

Figure 5:
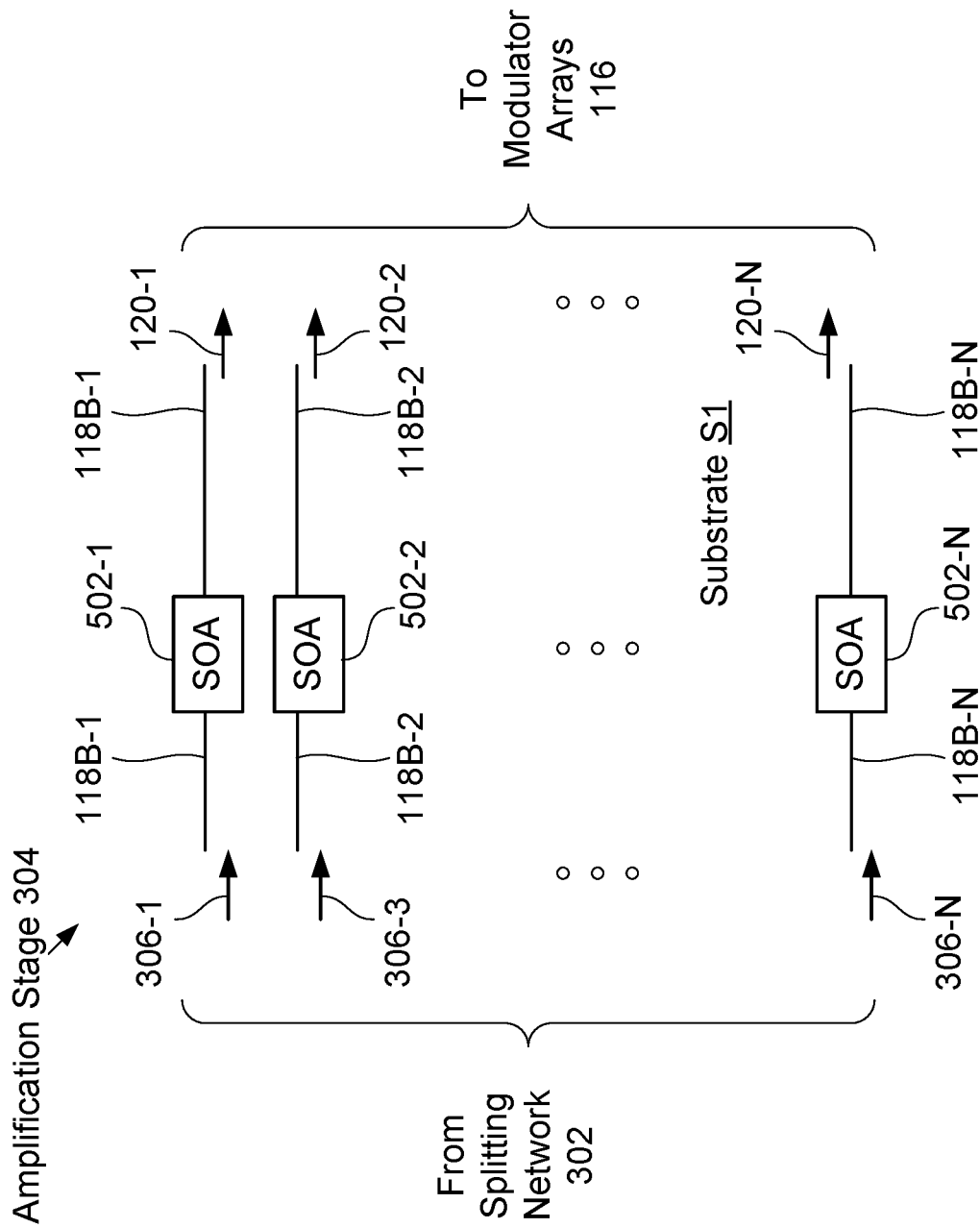
FIG. 5 depicts a schematic drawing of an amplification stage in accordance with the illustrative embodiment.

FIG. 5 depicts a schematic drawing of an amplification stage in accordance with the illustrative embodiment. Amplification stage 304 includes SOA 502-1 through 502-N (referred to, collectively, as SOA 502), which are optically coupled with waveguides 118B-1 through 118B-N, respectively.

SOA 502 are configured to amplify light signals 306 by a desired amplification factor to realize amplified light signals 120. In some embodiments, at least one of SOA 502 imprints a marker tone or signal on the light passing through it (via, for example, electrical modulation, etc.) so that the amplified light signal 120 it provides can be distinguished from the other amplified light signals.

In some embodiments, at least one of SOA 502 provides a gain that is different than at least one other SOA 502. Such an arrangement of SOA enables, for example, compensation of power differences in light signals 306, equalizing of the powers of light signals 120, provision of light signals 120 that have different power levels, and so on.

In the depicted example, each of SOA 502 is a quantum-dot-based SOA formed via hybrid-silicon fabrication techniques, such as those disclosed in U.S. Pat. Nos. 11,131,806 and 11,150,406, each of which is incorporated herein by reference in its entirety. In some embodiments, at least one of SOA 502 includes a quantum element other than a quantum dot, such as a quantum wire, quantum dash, and the like. In some embodiments, at least one of SOA 502 does not contain a quantum dot, dash, wire, or the like. The use of a quantum-element-containing material in SOA 502 yields advantages such as improved noise performance (especially for multiple wavelength components on the same spatial channel) and reduced impact of back reflections, which are both important factors for SOA operation. Quantum-dot-based SOA material can also enable each individual line of a multiple-wavelength laser to have its relative intensity noise reduced, if each wavelength can reach saturation in the SOA. This is not possible in quantum-well-based SOA because its gain is shared and saturated between wavelengths; however, it can be possible in quantum-dot-based SOA due to their more discrete gain and saturation for each wavelength.

In some embodiments, SOA 502 are hetero-epitaxially grown on substrate S1.

In some embodiments, at least one of SOA 502 is located on a different substrate than that of splitting network 302. In some such embodiments, each SOA that is located on a different substrate is optically coupled with splitting network 302 via a corresponding port (e.g., an input or output facet, grating coupler, etc.).

As will be appreciated by one skilled in the art, after reading this Specification, an SOA is significantly less sensitive to temperature variations than a laser. For example, the gain peak of an SOA shifts with temperature by approximately 0.5 nm/° C., while the lasing wavelength of a laser typically shifts by approximately 0.1 nm/° C. However, the gain-peak shift of an SOA does not affect the wavelength of the light that is emitted from the SOA (rather, the emitted wavelength is entirely determined by the input wavelength). The gain-peak shift only affects the amount of gain that the input light receives after passing through the SOA. Therefore, as long as the gain bandwidth of an SOA is sufficiently broad (typically at least 30 nm or more), an input wavelength will be amplified even when the temperature of the SOA changes significantly. As a consequence, an SOA requires less control electronics and fewer signal pins.

As noted above, light source 102 is optically coupled with PIC 106 via an optical path comprising an optical fiber or free space link. It is an aspect of this disclosure that optical path 104 enables the light source to be remotely located from PIC 106 such that the light source and PIC can reside in different environments (i.e., E1 and E2) that have at least one environmental parameter that is different, such as ambient temperature, temperature stability, and the like.

For example, in some embodiments, PIC 106 can be located very close to a computing node without incurring significant penalty due to the associated high-temperature environment.

In addition, locating light source 102 remotely from PIC 106 enables the SOA to be as far from the laser as possible since the gain of the SOA can compensate for more optical loss between the laser and SOA. This approach also mitigates loss elsewhere in the system, such as between the SOA output and the modulators and/or receivers, and the like, thereby improving loss budgets for components or links located elsewhere in the optical system.

Furthermore, an SOA can also preserve the integrity of its input signal, provided the intensity of the input signal is sufficient. In fact, in some cases, an SOA can even improve relative intensity noise of an input signal.

Still further, physically separating light source 102 and PIC 106 enables the laser or lasers in the light source to be fabricated separately from SOA 502 and modulators 116. As a result, the material and/or device architecture can be substantially optimized for each device, independent of the other, thereby creating a solution that decouples cost, performance, and reliability.

In addition, multiple amplified light signals can be generated from the output of a single laser, thereby enabling the costs and complexity associated with multiple-source-based systems of the prior art to be mitigated. For example, SOA used to amplify one or more of the light signals on PIC 106 require fewer isolators than would be necessary for a comparable number of lasers. As would be apparent to one skilled in the art, in some cases, an SOA can also require one or two isolators, such as to suppress reflections on both sides of the SOA that can cause multi-path interference (sometimes also referred to as "gain ripple"), which can interfere with data that encoded on the light signal it is amplifying. However, such multi-path interference is only significant if the relative amount of net gain in the SOA path approaches the amount of reflection intensity on both sides of the SOA path; therefore, an SOA is less likely to require an isolator than a laser, particularly if SOA gain is kept at a moderate or low level.

As a result, systems in accordance with the present disclosure afford significant advantages over prior art systems for providing multiple light signals, such as:
  i. improved reliability and lifetime; or
  ii. higher system yield; or
  iii. lower cost and/or complexity; or
  iv. lower electrical power consumption; or
  v. improved eye safety; or
  vi. improved bandwidth density per unit area; or
  vii. improved system scalability; or
  viii. improved noise performance;

ix. enables physical separation (i.e., remote location) of lasers, SOA, and/or modulators such that each can be located in different environments having different ambient conditions; or x. any combination of i, ii, iii, iv, v, vi, vii, viii, and ix.

Returning now to method 200, at optional operation 204, digital data is imprinted on each wavelength component λ1 through λn of each of amplified light signals 120-1 through 120-N.

Amplification stage 304 provides amplified light signals 120-1 through 120-N to modulator arrays 116-1 through 116-N, respectively.

Figure 6:
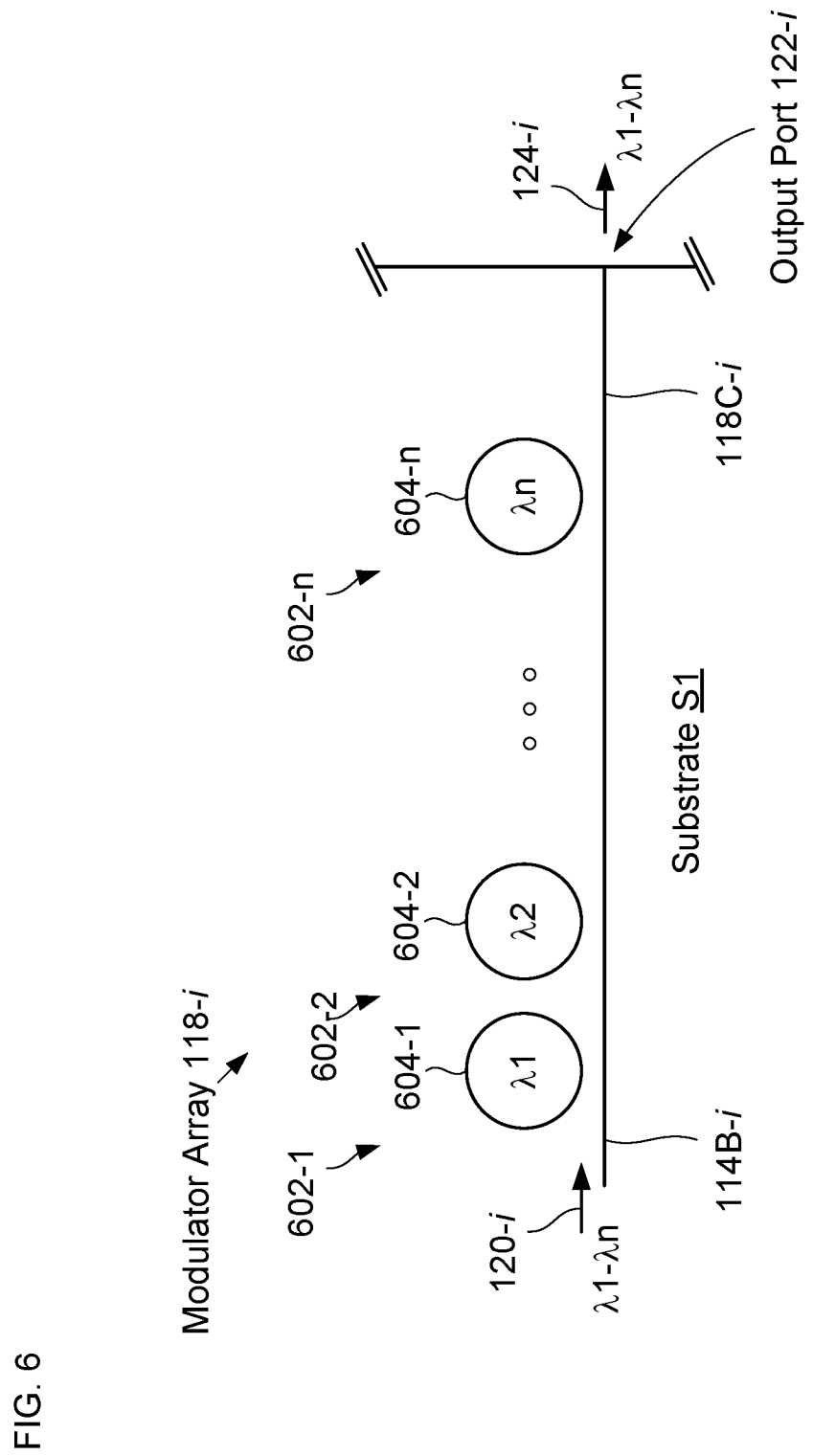
FIG. 6 depicts a schematic drawing of an exemplary modulator array in accordance with the illustrative embodiment.

FIG. 6 depicts a schematic drawing of an exemplary modulator array in accordance with the illustrative embodiment. Modulator array 118-$i$ is representative of each of modulator arrays 116-1 through 116-N. Modulator array 118-$i$ includes waveguide 114B-$i$ and optical data modulators 602-1 through 602-$n$.

Waveguide 114B-$i$ functions as a common bus waveguide for each of the n optical data modulators.

In the depicted example, modulators 602-1 through 602-$n$ are conventional depletion-mode microring modulators that include closed-loop waveguides 604-1 through 604-$n$, respectively. Each of closed-loop waveguides 604-1 through 604-$n$ includes a lateral p-n junction and a tuning element (e.g., a heater, etc.) for spectrally tuning the ring so that it optically coupled with waveguide 114B-$i$ for only one of wavelength components λ1 through λn. As a result, each of modulators 602-1 through 602-$n$ selectively imprints a data signal on a different one of wavelength components λ1 through λn as amplified light signal 120-$i$ passes through waveguide 114B-$i$ to output port 122-$i$.

In some embodiments, at least one modulator of modulator arrays 116 is a different waveguide modulator. For example, in some embodiments, at least one modulator of modulator arrays 116 is formed of silicon germanium. In some embodiments, at least one modulator of modulator arrays 116 is formed on substrate S1 in a compound semiconductor material stack grown on, or bonded to, the substrate.

As will be apparent to one skilled in the art, after reading this disclosure, in embodiments wherein laser signal 108 includes only a single-wavelength, each of modulator arrays 116 requires only one modulator.

At optional operation 205, the modulated wavelength components in each of amplified light signals 120-1 through 120-N are collectively provided as output signals 124-1 through 124-N at output ports 122-1 through 122-N, respectively.

In some embodiments, at least one modulator of modulator arrays 116 is located on a separate substrate from that of PIC 106 and optically coupled with SOA 502. It should be noted, however, that the cost of the fiber interconnections between the SOA and the modulators, and their corresponding optical-coupling interfaces, in such embodiments could be cost-prohibitive for some applications.

In some embodiments, PIC 106 does not include modulators and the amplified light signals provided by S/A stage 114 are provided directly at output ports 122-1 through 122-N. Such embodiments are particularly well suited for applications, such as LiDAR, certain sensing applications, and the like.

Although the illustrative embodiment employs a splitting/amplification stage that splits an incoming signal prior to amplification, in some embodiments, it can be advantageous to amplify the incoming signal before splitting.

Figure 7:
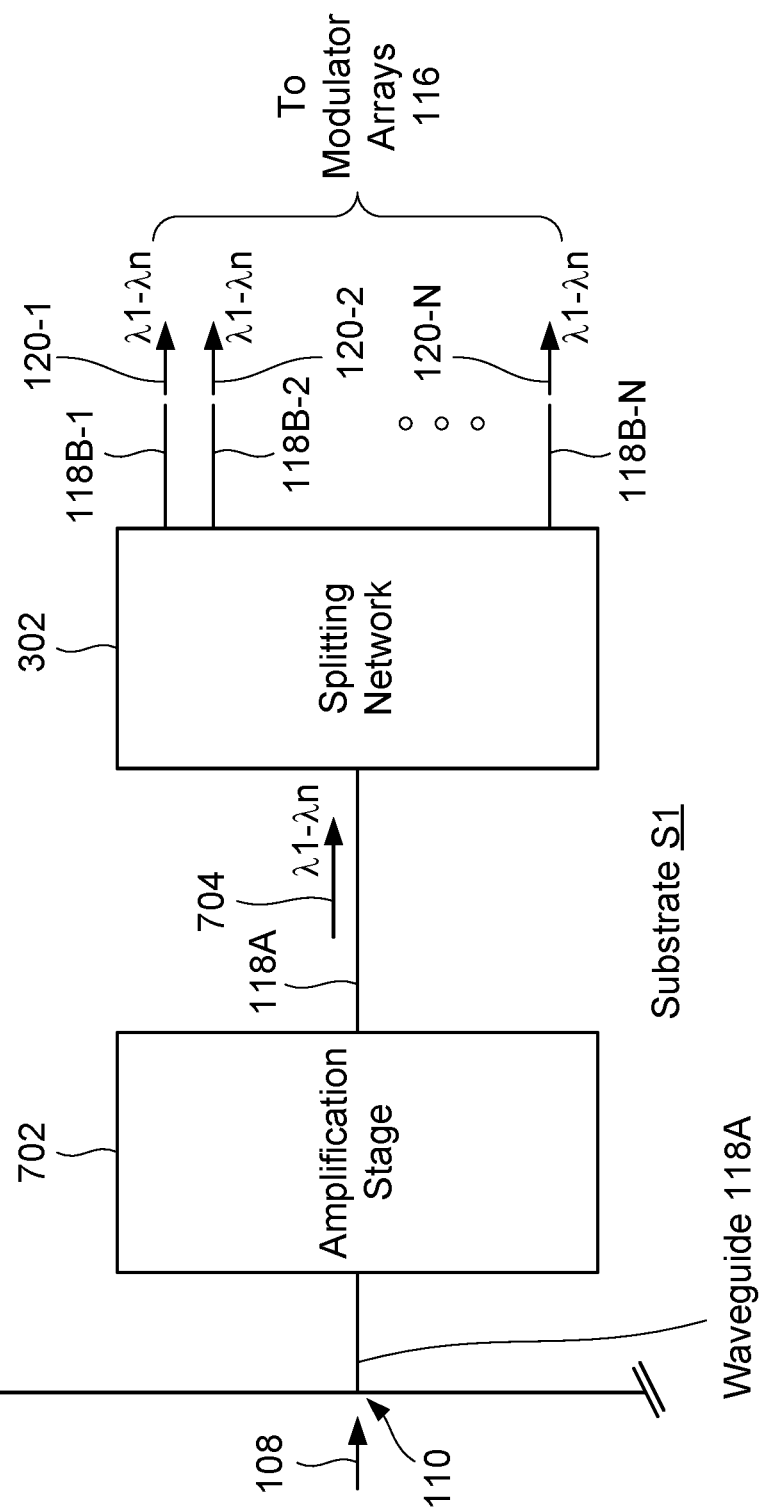
FIG. 7 depicts a schematic drawing of an alternative exemplary S/A stage in accordance with the present disclosure.

FIG. 7 depicts a schematic drawing of an alternative exemplary S/A stage in accordance with the present disclosure. S/A stage 700 includes amplification stage 702 and splitting network 302.

Amplification stage 702 includes a single SOA 502, which is operatively coupled with waveguide 118A.

In S/A stage 700, once laser signal 108 is coupled into input port 110, it is amplified by amplification stage 702 to give rise to amplified laser signal 704. The amplified laser signal is then provided to splitting network 302, where it is split into N amplified light signals 120, as described above.

Although each of S/A stages 116 and 702 includes infrastructure suitable for a single stage of splitting and amplification, S/A stages in accordance with the present disclosure can include any number of splitting and amplification stages without departing from its teachings. In some embodiments, multiple stages of splitting and amplification are included and are distributed on at least two substrates.

Furthermore, in some embodiments, an S/A stage includes one or more switches for selecting which SOA are used for amplification. In some embodiments one or more optical power monitoring devices (e.g., power-monitoring diodes) are included to, for example, monitor the power of laser signal 108, monitor the power of the output of at least one SOA, and the like.

Although the system 100 includes a single splitting/amplification stage, it should be noted that multiple stages of amplification and splitting can be used without departing from the scope of the present disclosure. In other words, the present disclosure enables systems in which the output of a single laser is split and amplified (or amplified and split), followed by at least one additional splitting/amplification stage in which at least one of the amplified light signals is split and amplified (or amplified and split) again, and so on. The process of process of splitting and amplifying can be repeated multiple times without substantial degradation of the CW light signal in terms of noise, as long as the power input to each SOA remains above a critical level. The multiple stages of splitting and amplifying can be located on a single substrate or on multiple substrates without departing from the scope of the present disclosure.

It should be noted that multiple stages of splitting and reamplification is difficult for modulated light signals. In some embodiments, however, modulator arrays 116 and SOA 502 are arranged such that some or all of the SOA are located after the modulator arrays (i.e., the SOA amplify the modulated light signals). Also, the power-dependent nonlinearities and optical losses discussed above can be avoided by keeping the optical power below very-high levels at all times.

Some systems in accordance with the present disclosure include multiple lasers, each of which is fiber coupled with a single PIC containing a like number of splitting/amplification stages and their corresponding modulators. However, regardless of the number of input laser signals to a PIC, it is an aspect of the present disclosure that the ratio of the number of amplified light signals to the number of input laser signals is greater than 1:1, thereby significantly reducing system cost and complexity as compared to prior-art light-distribution systems.

It is yet another aspect of the present disclosure that, for WDM systems, positioning a single laser remotely to the modulators and using a low- to moderate-power light signal that is provided to one or more SOA co-located with the modulators provides significant advantages over the prior art.

As noted above, prior-art WDM systems are fraught with many of the same problems described above, as well as significant link loss when a multi-wavelength signal is split into individual wavelength components that are then amplified and recombined.

It is another aspect of the present invention that advantages accrue from first power splitting a WDM laser signal to create separate spatial WDM channels that preserve all wavelength components on each channel, then amplifying each spatial channel to maintain the potential for high bandwidth density on each spatial lane. Such an approach enables relatively lower loss, since splitters can have very low loss compared to wavelength multiplexers and demultiplexers. It should be noted that multi-wavelength lasers that use power splitting without subsequent amplification are subject to the same limitations outlined above with respect to single-wavelength high-powered lasers.

Embodiments in accordance with the present disclosure are also afforded benefits from the simple fact that an SOA (particularly quantum-dot-based SOA having a wide gain bandwidth) can be significantly easier to control compared to lasers. For example, a laser to be used in a DWDM system is likely to require precise temperature control, as well as potentially requiring a wavelength locker. As a result, such systems will need to include bulky temperature control and heat sinking, and possibly electronic control circuits and/or complex optical features. Incorporating such capability on the same chip, or even at the same location, as a modulator chip can be very problematic. However, a properly designed SOA can be a simple optical component that can also tolerate very high and/or relatively unstable temperatures. Furthermore, if an SOA is properly designed and the corresponding system is well designed, it can have lower current densities compared to a laser, which translates to better reliability/lifetime which is essential for photonic integrated circuits that contain the modulators due to their location deep in the system and the associated difficulty in replacing them.

Figure 8:
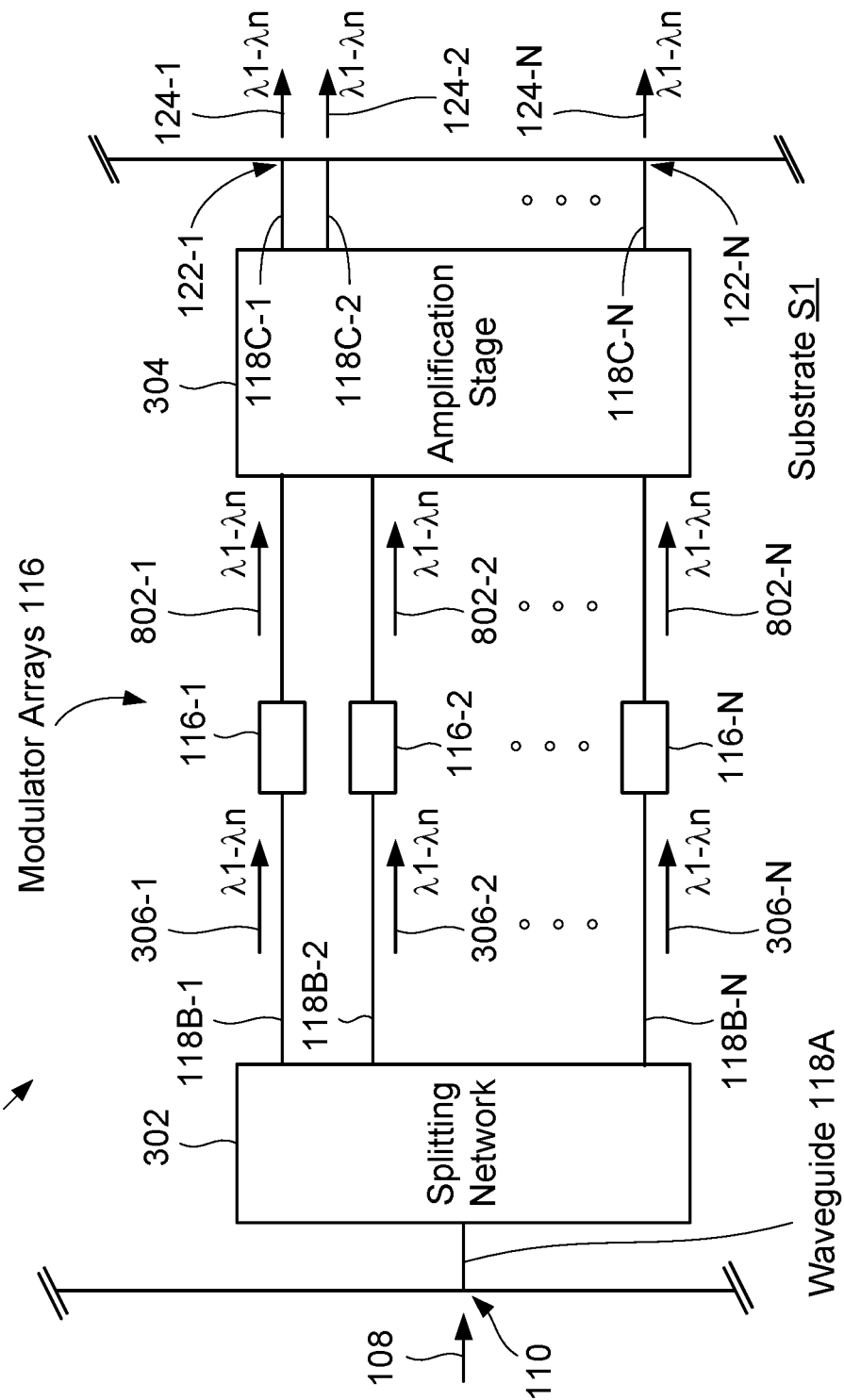
FIG. 8 depicts a splitting/amplification stage suitable for use in a light-distribution system in accordance with the present disclosure in which one or more modulated signals are amplified by a plurality of SOA.

As noted above, it can be desirable to amplify a light signal after it has been modulated. FIG. 8 depicts a splitting/amplification stage suitable for use in a light-distribution system in accordance with the present disclosure in which one or more modulated signals are amplified by a plurality of SOA.

S/A stage 800 is analogous to S/A stage 114 described above; however, S/A stage 800 includes modulator arrays 116 such that the modulator arrays are optically coupled between splitting network 302 and amplification stage 304.

In S/A stage 800, modulator arrays 116-1 through 116-N receive light signals 306-1 through 306-N, respectively.

Each of modulator arrays 116-1 through 116-N imprints data onto each of the wavelength components, $\lambda 1$ through $\lambda N$, included in its respective light signal. The modulator arrays then provide modulated light signals 802-1 through 802-N to amplification stage 304.

Due to the arrangement of S/A stage 800, the amplification stage 304 includes output ports 122, at which the amplified modulated light signals are provided as output signals 124-1 through 124-N.

It should be noted that, although the depicted example includes a single substrate containing splitting network 302, modulator arrays 116, and amplification stage 304, in some embodiments, at least one of splitting network 302, modulator arrays 116, and amplification stage 304 is located on a separate substrate.

It is to be understood that the disclosure teaches just some examples of embodiments in accordance with the present disclosure and that many variations of the invention can easily be devised by those skilled in the art after reading this disclosure and that the scope of the present invention is to be determined by the following claims.

What is claimed is:

1. A light-distribution system comprising:
a first light source for providing a first laser signal; and
a first photonic integrated circuit (PIC) comprising a first splitting/amplification (S/A) stage that includes (1) a first amplification stage comprising at least one semiconductor optical amplifier (SOA) and (2) a first optical-power splitting network, wherein the first S/A stage is configured to receive the first laser signal and provide a first plurality of amplified light signals based on the first light signal;
wherein the first light source and first PIC are optically coupled via an optical path that is configured to enable the first light source and the first PIC to be remotely located with respect to one another such that the first light source and the first PIC are located in different environments that have at least one different environmental parameter that includes at least one of ambient temperature and temperature stability.

2. The system of claim 1 wherein the first splitting network receives the first laser signal and distributes it into a first plurality of light signals, and wherein the first amplification stage includes a plurality of SOA, each SOA of the plurality thereof amplifying a different light signal of the first plurality thereof to produce a different one of the first plurality of amplified light signals.

3. The system of claim 2 wherein a first SOA of the plurality of SOA is modulated.

4. The system of claim 1 wherein the first amplification stage amplifies the first laser signal to generate a first amplified laser signal, and wherein the first splitting network distributes the optical energy of the first amplified laser signal into the first plurality of amplified light signals.

5. The system of claim 1 further comprising a first plurality of modulator arrays, wherein each modulator array of the first plurality thereof is configured to modulate at least one wavelength component of a different amplified light signal of the first plurality thereof.

6. The system of claim 5 wherein each of the first S/A stage and the first plurality of modulator arrays is disposed on the same substrate.

7. The system of claim 6 wherein the substrate is a silicon substrate.

8. The system of claim 7 wherein the at least one SOA includes a gain layer comprising a compound semiconductor and at least one quantum element selected from the group consisting of a quantum dot, a quantum dash, a quantum well, and a quantum wire.

9. The system of claim 1 wherein the first laser signal includes a plurality of wavelength components, and wherein each of the first plurality of amplified light signals includes the plurality of wavelength components.

10. The system of claim 1 wherein the at least one SOA includes a gain layer comprising a compound semiconductor and at least one quantum element selected from the group consisting of a quantum dot, a quantum dash, a quantum well, and a quantum wire.

11. The system of claim 1 further comprising a second S/A stage that includes (1) a second amplification stage comprising at least one SOA and (2) a second splitting network, wherein the second S/A stage is configured to receive a first amplified light signal of the first plurality thereof and provide a second plurality of amplified light signals based on the first amplified light signal.

12. The system of claim 11 wherein each of the first S/A stage and second S/A stage is disposed on the same substrate.

13. The system of claim 1 further comprising a first system that includes the light distribution system, wherein the first system is selected from the group consisting of a lidar system, a telecommunications system, and a data communications system.

14. The system of claim 1 wherein the first S/A stage comprises a plurality of modulator arrays that is configured to receive a plurality of light signals from the first optical-power splitting network and provide a plurality of modulated light signals to the first amplification stage.

15. A method for distributing light, the method including:
generating a first laser signal at a first light source;
coupling the first laser signal into an input port of a first photonic integrated circuit (PIC) that includes a first splitting/amplification (S/A) stage having (1) a first amplification stage comprising at least one semiconductor optical amplifier (SOA) and (2) a first optical-power splitting network, the first light source and the first PIC being located in different environments that have at least one different environmental parameter that includes at least one of ambient temperature and temperature stability; and
splitting and amplifying the optical energy of the first laser signal in the first S/A stage to provide a first plurality of amplified light signals.

16. The method of claim 15 further comprising:
locating the first light source in a first environment; and
locating the first PIC in a second environment;
wherein the first environment and second environment have a different environmental parameter selected from the group consisting of temperature and temperature stability.

17. The method of claim 15 further comprising modulating at least one wavelength component included in a first amplified light signal of the first plurality thereof.

18. The method of claim 17 wherein the at least one wavelength component is modulated by a first modulator that is included in the first PIC, and wherein the first S/A stage and the first modulator are disposed on the same substrate.

19. The method of claim 17 wherein the first PIC is disposed on a first substrate and the at least one wavelength component is modulated by a first modulator that is disposed on a second substrate.

20. The method of claim 15 further comprising providing the first PIC such that the first S/A stage includes a splitting network and a plurality of SOA that includes the at least one SOA, wherein first S/A stage splits and amplifies the first laser signal to provide the first plurality of amplified light signals by operations including:
distributing the optical energy of the first laser signal into a first plurality of light signals at the splitting network; and
amplifying the first plurality of light signals at the plurality of SOA.

21. The method of claim 20 further comprising imprinting a marker tone on a first amplified light signal of the first plurality thereof by modulating a first SOA of the plurality thereof.

22. The method of claim 15 further comprising providing the first PIC such that the first S/A stage includes a first SOA of the at least one SOA and a splitting network, wherein first S/A stage splits and amplifies the first laser signal to provide the first plurality of amplified light signals by operations including:
amplifying the first laser signal at the first SOA to provide a first amplified laser signal; and
distributing the optical energy of the first amplified laser signal into the first plurality of amplified light signals.

23. The method of claim 15 further comprising providing the first PIC such that the at least one SOA and the splitting network are disposed on a silicon substrate.

24. The method of claim 23 further comprising the at least one SOA such that it includes a gain layer comprising a quantum element selected from the group consisting of a quantum dot, a quantum dash, a quantum well, and a quantum wire.

25. The method of claim 15 further comprising the at least one SOA such that it includes a gain layer comprising a compound semiconductor and at least one quantum element selected from the group consisting of a quantum dot, a quantum dash, a quantum well, and a quantum wire.

26. The method of claim 15 wherein the first laser signal is generated such that it includes a plurality of wavelength components, and wherein the first plurality of amplified light signals is provided such that each includes the plurality of wavelength components.

27. The method of claim 15 wherein the first plurality of amplified light signals is provided as amplified modulated light signals by operations that include:
splitting the first laser signal into a plurality of light signals;
modulating at least one wavelength component of each light signal of the plurality thereof to provide a plurality of modulated light signals; and
amplifying each modulated light signal of the plurality thereof.

28. The method of claim 15 further comprising:
optically coupling a first amplified light signal of the first plurality thereof into a second S/A stage; and
splitting and amplifying the optical energy of the first amplified light signal in the second S/A stage to provide a second plurality of amplified light signals.

29. The method of claim 28 further comprising providing the first S/A stage and second S/A stage such that they are disposed on the same substrate.

30. The method of claim 15 further comprising providing the first plurality of amplified light signals to a first system selected from the group consisting of a LiDAR system, a telecommunications system, and a data communications system.

31. A light-distribution system comprising:
a first light source for providing a first laser signal; and
a first photonic integrated circuit (PIC) comprising a first splitting/amplification (S/A) stage that includes (1) a first amplification stage comprising at least one semiconductor optical amplifier (SOA) and (2) a first optical-power splitting network, wherein the first S/A stage is configured to receive the first laser signal and provide a first plurality of amplified light signals based on the first light signal;
wherein the first light source and first PIC are optically coupled via an optical path that is configured to enable the first light source and the first PIC to be remotely located with respect to one another, wherein the first splitting network receives the first laser signal and distributes it into a first plurality of light signals, and further wherein the first amplification stage includes a plurality of SOA, each SOA of the plurality thereof amplifying a different light signal of the first plurality thereof to produce a different one of the first plurality of amplified light signals, a first SOA of the plurality of SOA being modulated.

32. A light-distribution system comprising:
a first light source for providing a first laser signal; and
a first photonic integrated circuit (PIC) comprising a first splitting/amplification (S/A) stage that includes (1) a first amplification stage comprising at least one semiconductor optical amplifier (SOA) and (2) a first optical-power splitting network, wherein the first S/A stage is configured to receive the first laser signal and provide a first plurality of amplified light signals based on the first light signal;
a first plurality of modulator arrays, wherein each modulator array of the first plurality thereof is configured to modulate at least one wavelength component of a different amplified light signal of the first plurality thereof; and
wherein the first light source and first PIC are optically coupled via an optical path that is configured to enable the first light source and the first PIC to be remotely located with respect to one another.

33. A light-distribution system comprising:
a first light source for providing a first laser signal; and
a first photonic integrated circuit (PIC) comprising a first splitting/amplification (S/A) stage that includes (1) a first amplification stage comprising at least one semiconductor optical amplifier (SOA) and (2) a first optical-power splitting network, wherein the first S/A stage is configured to receive the first laser signal and provide a first plurality of amplified light signals based on the first light signal;
a second S/A stage that includes (1) a second amplification stage comprising at least one SOA and (2) a second splitting network, wherein the second S/A stage is configured to receive a first amplified light signal of the first plurality thereof and provide a second plurality of amplified light signals based on the first amplified light signal; and
wherein the first light source and first PIC are optically coupled via an optical path that is configured to enable the first light source and the first PIC to be remotely located with respect to one another.

34. A light-distribution system comprising:
a first light source for providing a first laser signal; and
a first photonic integrated circuit (PIC) comprising a first splitting/amplification (S/A) stage that includes (1) a first amplification stage comprising at least one semiconductor optical amplifier (SOA) and (2) a first optical-power splitting network, wherein the first S/A stage is configured to receive the first laser signal and provide a first plurality of amplified light signals based on the first light signal;
wherein the first S/A stage comprises a plurality of modulator arrays that is configured to receive a plurality of light signals from the first optical-power splitting network and provide a plurality of modulated light signals to the first amplification stage; and
wherein the first light source and first PIC are optically coupled via an optical path that is configured to enable the first light source and the first PIC to be remotely located with respect to one another.

35. A method for distributing light, the method including:
generating a first laser signal at a first light source;
coupling the first laser signal into an input port of a first photonic integrated circuit (PIC) that includes a first splitting/amplification (S/A) stage having (1) a first amplification stage comprising at least one semiconductor optical amplifier (SOA) and (2) a first optical-power splitting network,
locating the first light source in a first environment and locating the first PIC in a second environment; and
splitting and amplifying the optical energy of the first laser signal in the first S/A stage to provide a first plurality of amplified light signals.

36. A method for distributing light, the method including:
generating a first laser signal at a first light source;
coupling the first laser signal into an input port of a first photonic integrated circuit (PIC) that includes a first splitting/amplification (S/A) stage having (1) a first amplification stage comprising at least one semiconductor optical amplifier (SOA) and (2) a first optical-power splitting network; and
splitting and amplifying the optical energy of the first laser signal in the first S/A stage to provide a first plurality of amplified light signals.

37. A method for distributing light, the method including:
generating a first laser signal at a first light source;
coupling the first laser signal into an input port of a first photonic integrated circuit (PIC) that includes a first splitting/amplification (S/A) stage having (1) a first amplification stage comprising at least one semiconductor optical amplifier (SOA) and (2) a first optical-power splitting network; and
splitting and amplifying the optical energy of the first laser signal in the first S/A stage to provide a first plurality of amplified light signals
imprinting a marker tone on a first amplified light signal of the first plurality thereof by modulating a first SOA of the plurality thereof.

38. A method for distributing light, the method including:
generating a first laser signal at a first light source;
coupling the first laser signal into an input port of a first photonic integrated circuit (PIC) that includes a first splitting/amplification (S/A) stage having (1) a first amplification stage comprising at least one semiconductor optical amplifier (SOA) and (2) a first optical-power splitting network; and
splitting and amplifying the optical energy of the first laser signal in the first S/A stage to provide a first plurality of amplified light signals;
wherein the first plurality of amplified light signals is provided as amplified modulated light signals by operations that include:
splitting the first laser signal into a plurality of light signals;
modulating at least one wavelength component of each light signal of the plurality thereof to provide a plurality of modulated light signals; and
amplifying each modulated light signal of the plurality thereof.

39. A method for distributing light, the method including:
generating a first laser signal at a first light source;
coupling the first laser signal into an input port of a first photonic integrated circuit (PIC) that includes a first splitting/amplification (S/A) stage having (1) a first amplification stage comprising at least one semiconductor optical amplifier (SOA) and (2) a first optical-power splitting network;
splitting and amplifying the optical energy of the first laser signal in the first S/A stage to provide a first plurality of amplified light signals;

optically coupling a first amplified light signal of the first plurality thereof into a second S/A stage; and splitting and amplifying the optical energy of the first amplified light signal in the second S/A stage to provide a second plurality of amplified light signals.

\* \* \* \* \*